(12) United States Patent
Liu et al.

(10) Patent No.: US 12,337,582 B2
(45) Date of Patent: Jun. 24, 2025

(54) HIGH-VELOCITY IMPACT-RESISTANT WAVE-TRANSPARENT COMPOSITE WITH BIO-INSPIRED NACRE-LIKE INTERLAMINAR TOUGHENING STRUCTURE, AND PREPARATION METHOD THEREOF

(71) Applicant: NORTH UNIVERSITY OF CHINA, Taiyuan (CN)

(72) Inventors: Yaqing Liu, Taiyuan (CN); Qihui Chen, Taiyuan (CN); Yu Zhang, Taiyuan (CN); Guizhe Zhao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 18/945,915

(22) Filed: Nov. 13, 2024

(65) Prior Publication Data
US 2025/0065599 A1 Feb. 27, 2025

Related U.S. Application Data

(63) Continuation of application No. PCT/CN2024/074083, filed on Jan. 25, 2024.

(30) Foreign Application Priority Data

Jan. 17, 2024 (CN) .......................... 202410067663.9

(51) Int. Cl.
*B32B 5/24* (2006.01)
*B32B 5/02* (2006.01)
(Continued)

(52) U.S. Cl.
CPC ................ *B32B 5/245* (2013.01); *B32B 5/02* (2013.01); *B32B 5/18* (2013.01); *B32B 5/32* (2013.01);
(Continued)

(58) Field of Classification Search
CPC .. B32B 5/245; B32B 5/02; B32B 5/18; B32B 5/32; B32B 2266/126; B32B 2307/7376;
(Continued)

(56) References Cited

U.S. PATENT DOCUMENTS

2017/0096548 A1   4/2017   Kim et al.
2017/0240424 A1   8/2017   Roberts et al.

FOREIGN PATENT DOCUMENTS

CN   109980127 A   7/2019
CN   111002644 A   4/2020
(Continued)

OTHER PUBLICATIONS

Dan Wei et al., "Development of novel biomass hybrid aerogel supported composite phase change materials with improved light-thermal conversion and thermal energy storage capacity", Advanced Composites and Hybrid Materials, Jun. 17, 2022, vol. 5, No. 3, pp. 1910-1921.
(Continued)

*Primary Examiner* — Hai Vo (57) ABSTRACT

An high-velocity impact-resistant wave-transparent composite, including an upper composite layer, a lower composite layer, and a bio-inspired nacre-like toughening structure arranged therebetween. The toughening structure has a soft-hard alternating nacre-like structure, and is made from a low dielectric constant sheet material and a resin. The upper composite layer and the lower composite layer are each independently made of a fiber-reinforced resin composite, a foam material, or a honeycomb material. A preparation method of the high-velocity impact-resistant wave-transparent composite is further provided.

9 Claims, 2 Drawing Sheets

(51) Int. Cl.
 *B32B 5/18* (2006.01)
 *B32B 5/32* (2006.01)

(52) U.S. Cl.
 CPC ..... *B32B 2250/03* (2013.01); *B32B 2260/023* (2013.01); *B32B 2260/046* (2013.01); *B32B 2262/0253* (2013.01); *B32B 2262/101* (2013.01); *B32B 2266/0235* (2013.01); *B32B 2266/08* (2013.01); *B32B 2266/126* (2016.11); *B32B 2307/204* (2013.01); *B32B 2307/542* (2013.01); *B32B 2307/546* (2013.01); *B32B 2307/558* (2013.01); *B32B 2307/7376* (2023.05)

(58) Field of Classification Search
 CPC .......... B32B 2250/03; B32B 2260/023; B32B 2260/046; B32B 2262/0243; B32B 2262/0253; B32B 2262/101; B32B 2266/0235; B32B 2266/08; B32B 2307/204; B32B 2307/542; B32B 2307/546; B32B 2307/558
 See application file for complete search history.

(56) References Cited

FOREIGN PATENT DOCUMENTS

| | | |
|---|---|---|
| CN | 111777841 A | 10/2020 |
| CN | 111841457 A | 10/2020 |
| CN | 111844996 A | 10/2020 |
| CN | 112677602 A | 4/2021 |
| CN | 115286898 A | 11/2022 |
| CN | 116144077 A | 5/2023 |
| KR | 20100036104 A | 4/2010 |
| WO | 2018140804 A1 | 8/2018 |
| WO | 2019212080 A1 | 11/2019 |

OTHER PUBLICATIONS

Yifan Zhang et al., "High temperature thermal reduction graphene aerogel/epoxy resin electromagnetic shielding composites", Journal of Functional Materials, Dec. 31, 2022, vol. 53, No. 3, pp. 3186-3192.

HIGH-VELOCITY IMPACT-RESISTANT WAVE-TRANSPARENT COMPOSITE WITH BIO-INSPIRED NACRE-LIKE INTERLAMINAR TOUGHENING STRUCTURE, AND PREPARATION METHOD THEREOF

CROSS-REFERENCE TO RELATED APPLICATIONS

This application is a continuation of International Patent Application No. PCT/CN2024/074083, filed on Jan. 25, 2024, which claims the benefit of priority from Chinese Patent Application No. 202410067663.9, filed on Jan. 17, 2024. The content of the aforementioned application, including any intervening amendments thereto, is incorporated herein by reference in its entirety.

TECHNICAL FIELD

This application relates to composites, and more particularly to a high-velocity impact-resistant wave-transparent composite with a bio-inspired nacre-like interlaminar toughening structure, and a preparation method thereof.

BACKGROUND

Composites are the main materials for radar antenna covers. While offering an electromagnetic window for antenna system, they also plays an important role in protecting the antenna system from damage caused from external harsh natural environment and high-velocity impact from unknown objects outside. In order to adapt to the increasingly complex battlefield environment, the composites are required to provide excellent wave-transparent performance and maintain the mechanical properties of the overall structure, and to be lightweight to provide better flexibility. As emerging protective materials, ultra-high molecular weight polyethylene (UHMWPE) fiber-reinforced, Poly-p-phenylene benzobisoxazole (PBO) fiber-reinforced and aramid fiber-reinforced resin composites have become research and application hotspots. Fiber-reinforced polymer composites have excellent impact resistance and protective performances, as well as lower density (mostly below 3 g/cm$^3$) compared to the traditional metal-based protective materials, thereby facilitating accelerating the development of lightweight and high-flexibility weapons. However, in the practical application, the fiber-reinforced polymer composites are prone to delamination and obvious back protrusion under the impact load. Although the fiber-reinforced polymer composites exhibit an effective protection effect against penetrating damage, they are prone to structure failure when suffering the non-penetrating damage, and fail to provide the desired stiffness. Improving the interlaminar bonding strength is commonly adopted to address the above problems.

To resist penetration damage, composites need to have large in-plane tensile deformations under the action of out-of-plane load to take full advantage of the axial tensile properties of fibers; and in terms of resisting non-penetration damage, composites need to have high in-plane stiffness to mitigate indentation deformation. In terms of energy dissipation mechanism, it is widely accepted that penetration resistance and non-penetration resistance are contradictory to each other. For special application environments, such as radar antenna covers, materials are required to have low dielectric properties, so it should avoid introducing substances and structures with a high dielectric constant while reinforcing these materials.

Great attention should be paid to the interface of composites. Therefore, it is urgent to seek an interface toughening method with excellent fracture toughness, low plastic deformation, and low dielectric constant and high wave-transparent performances to improve the application of composites in the field of radar antenna covers.

SUMMARY

In view of the deficiencies in the prior art, this application provides a high-velocity impact-resistant wave-transparent composite with a bio-inspired nacre-like interlaminar toughening structure. The bio-inspired nacre-like interlaminar toughening structure has low dielectric performance and high crack-arrest capability, and its preparation method is simple and convenient. Compared to the traditional single-component interlaminar toughening structure, the composite interlaminar toughening structure provided in this application has the advantages of low deformation, high impact resistance, and low dielectric property, and high wave-transparent performance.

Technical solutions of this application are described as follows.

This application provides a high-velocity impact-resistant wave-transparent composite, comprising:
an upper composite layer;
a lower composite layer; and
a bio-inspired nacre-like toughening structure arranged between the upper composite layer and the lower composite layer;
wherein the upper composite layer and the lower composite layer are each independently made of a fiber-reinforced resin composite, a foam material, or a honeycomb material;
the bio-inspired nacre-like toughening structure is configured to have a high-performance soft-hard alternating nacre-like structure which can prevent crack propagation, improve interlaminar performance and have a low dielectric constant; and the high-performance soft-hard alternating nacre-like structure is constructed by a low-dielectric sheet material and a resin; the bio-inspired nacre-like toughening structure is a resin-filled aerogel, and is prepared through steps of:
assembling an α-zirconium phosphate (α-ZrP) nanosheet mixture by directional freezing to construct an α-ZrP aerogel with an oriented continuous network structure; and
infusing a resin into the α-ZrP aerogel to form a bio-inspired nacre-like toughening structure with the soft-hard alternating nacre-like structure, wherein the resin is configured as a soft layer, and a wall of the α-ZrP aerogel is configured as a hard layer; and
the resin is configured to bond the α-ZrP aerogel into a whole to maintain the α-ZrP aerogel in a certain shape, transmit an interlaminar stress, and protect the α-ZrP aerogel from external erosion and damage; and the hard layer is filled between an upper composite layer and a lower composite layer in an aerogel form to improve interlaminar mechanical performance and wave-transparent performance. When the overall structure is subjected to impact, a main crack can be deflected, differentiated and terminated to prevent the extension of the main crack in the layers, so as to effectively inhibit the delamination.

The bio-inspired nacre-like toughening structure can be used in an interlayer of the same or different fiber-reinforced resin composites, an interlayer of discontinuous foam materials and discontinuous honeycomb materials, and an interlayer of discontinuous foam materials/discontinuous honeycomb materials and the fiber-reinforced resin composites.

In an embodiment, the α-ZrP aerogel is prepared by directional freezing of an aqueous dispersion system of an α-ZrP nanosheet obtained by in-situ exfoliation and a cellulose; the α-ZrP aerogel is oriented perpendicular to a horizontal direction and has a uniform wall thickness and a uniform pore distribution; and the cellulose is constructed as a framework for structurally reinforcing the α-ZrP aerogel;

the in-situ exfoliation is performed by exfoliating an original α-ZrP sheet material with an amino-containing small molecule substance as an exfoliating agent by an ultrasound-assisted exfoliation technology under a preset ultrasound power for a preset period to arrive at the α-ZrP nanosheet with a desired two-dimensional size and a thickness; and the cellulose is selected from the group consisting of carboxymethyl cellulose, hydroxyethyl cellulose, hydroxypropyl cellulose, bacterial cellulose and a combination thereof.

In an embodiment, the exfoliating agent is selected from the group consisting of triethanolamine, ethylenediamine, lysine and a combination thereof.

In an embodiment, the resin is a thermosetting resin system obtained by uniformly mixing a thermosetting resin, a curing agent, and a reaction aid; the thermosetting resin is selected from the group consisting of an epoxy resin, an unsaturated polyester resin, a phenolic resin and a combination thereof; and the reaction aid is selected from the group consisting of an initiator, an accelerator, a catalyst and a combination thereof.

In an embodiment, in the aqueous dispersion system, a weight ratio of the α-ZrP nanosheet to the cellulose is 10-5:2-1.

In an embodiment, the α-ZrP nanosheet has a nanoscale two-dimensional sheet structure with a two-dimensional sheet size of 300-1700 nm and a sheet thickness of 30-100 nm; and the α-ZrP aerogel has a thickness of 0.1-0.4 mm and a surface density of 20-100 $g/m^2$.

In an embodiment, the bio-inspired nacre-like toughening structure has a thickness of 0.1-0.4 mm, a dielectric constant of 2.45-2.72, a loss tangent of 0.028-0.042, a flexural strength of 100-130 MPa, a maximum flexural strain of 4-6%, and a mode I critical energy release rate of 1.02-1.58 $KJ/m^2$; the high-velocity impact-resistant wave-transparent composite, a mode I critical energy release rate of a bonding interface is 0.7-1.2 $KJ/m^2$, a mode II critical energy release rate of the bonding interface is 3.0-3.8 $KJ/m^2$, and an interlaminar shear strength is 55-75 MPa.

This application further provides a method for preparing the high-velocity impact-resistant wave-transparent composite above, comprising:
(1) dispersing α-ZrP powder in water followed by addition of an exfoliating agent and stirring for uniform dispersion to obtain an intercalated α-ZrP dispersion; and transferring the intercalated α-ZrP dispersion to an ultrasonic cell disrupter followed by ultrasonication to obtain an exfoliated α-ZrP dispersion with a desired exfoliation degree;
(2) dissolving a cellulose in the exfoliated α-ZrP dispersion to obtain an aqueous dispersion system; pouring the aqueous dispersion system into a copper-bottomed mold parallel to the ground; adding liquid nitrogen to cover a bottom of the copper-bottomed mold to freeze the aqueous dispersion system; when the aqueous dispersion system is completely frozen, transferring the copper-bottomed mold to a freeze dryer following by freeze-drying and demolding to produce an α-ZrP aerogel;
(3) mixing a thermosetting resin with a curing agent under mechanical stirring until the resin system has uniform color; adding a reaction aid into the resin system followed by mechanical stirring and vacuum degassing in an oven until no bubbles are generated to obtain the resin;
(4) immersing the α-ZrP aerogel obtained in step (2) in the resin obtained in step (3) followed by vacuumization to completely fill the α-ZrP aerogel with the resin and pre-curing at an elevated temperature to obtain a pre-cured body of the bio-inspired nacre-like interlaminar toughening structure; and
(5) placing the pre-cured body between an upper composite layer and a lower composite layer followed by integral curing through a liquid molding process or an autoclave molding process to obtain the high-velocity impact-resistant wave-transparent composite.

In an embodiment, in step (1), the ultrasonication is performed at 150-300 W for 3-15 min; and
in step (2), a temperature of the liquid nitrogen is −196° C.; and the freeze-drying is performed at a temperature ranging from −65° C. to −45° C. and a vacuum degree ranging from −0.05 MPa to −0.09 MPa for 36-48 h.

In an embodiment, in step (4), the vacuumization is performed at a temperature of 60-80° C. and an exhaust rate of 2 L/min for 0.5-1 h to reach a vacuum degree of −0.09 MPa.

Compared to the prior art, this application has the following beneficial effects.
(1) The high-velocity impact-resistant wave-transparent composites in this application have high interlaminar performance, enhance the critical energy release rate of the composites, and effectively inhibit the interlaminar delamination failure as well as penetrating damage and non-penetrating damage caused by the external impact. The prepared composites have high wave-transparent performance and can be applied in the field of composites that have high requirements for impact resistance and wave-transparent performance, such as meteorological radar antenna covers, vehicle-mounted antenna covers, and aircraft shell.
(2) In the bio-inspired nacre-like interlaminar toughening structure, the thermosetting resin system can bond the aerogel into a whole and maintain a certain shape, transfer the interlaminar stress, and protect the aerogel from external erosion and damage. The cellulose is used as the reinforcing framework of the α-ZrP aerogel structure, which can reinforce the structure of the α-ZrP aerogel. Moreover, α-ZrP, as a low dielectric constant material, is filled in the form of an aerogel between the composite layers, which can enhance the mechanical properties and the wave-transparent properties of the interlaminar phases. In the case of encountering the interlaminar crack propagation caused by external impacts, the aerogel wall formed by α-ZrP sheets will undergo slipping, pulling out, and fracture to alleviate and eliminate the stress concentration at the crack tip, dissipate lots of energy, and trigger the crack deflection, bifurcation and termination to prevent the interlayer propagation of main cracks, so as to effectively inhibit the delamination.

(3) The modulus of the α-ZrP sheet is significantly different from that of the resin matrix, and the alternating arrangement of the materials with a relatively large modulus difference can also enhance the crack arrest performance.

(4) The interlaminar aerogel can extend the interlayer space and increase the resin content between the composite material layers, so that it is more difficult for cracks to extend to the relatively-fragile interface, thereby improving the overall performance and the anti-delamination performance of the composite effectively.

BRIEF DESCRIPTION OF THE DRAWINGS

In the drawings:
1—upper composite layer; 2—bio-inspired nacre-like interlaminar toughening structure; 3—lower composite layer; 4—α-ZrP aerogel; and 5—resin matrix phase.

DETAILED DESCRIPTION OF EMBODIMENTS

The present disclosure will be further described in detail below in conjunction with the accompanying drawings and embodiments.

Example 1

Provided herein was a method for preparing a high-velocity impact-resistant wave-transparent composite, which included a bio-inspired nacre-like interlaminar toughening structure arranged between a glass fiber-reinforced epoxy resin composite and an ultra-high molecular weight polyethylene (UHMWPE) fiber-reinforced epoxy resin composite.

(1) 20 g of E-51 epoxy resin was weighed, added with 15.8 g of an anhydride curing agent (hexahydrophthalic anhydride (HHPA)) and 0.06 g of an accelerator (2,4,6-Tris(dimethylaminomethyl) phenol (DMP-30)), mixed uniformly, and degassed under vacuum at 50° C. until no bubbles were generated to obtain an epoxy resin system.

(2) 1.43 g of α-ZrP powder was uniformly dispersed in 150 mL of deionized water, followed by adding 1.51 g of an exfoliating agent (triethanolamine) at a molar ratio of 2:1 and stirring for uniform dispersion to obtain the intercalated α-ZrP dispersion. The intercalated α-ZrP dispersion was transferred to an ultrasonic cell disrupter followed by performing ultrasonication at a power of 300 W for 9 min, thereby obtaining the exfoliated α-ZrP nanosheet dispersion. The two-dimensional α-ZrP sheet had an average sheet size of 600 nm and an average sheet thickness of 40 nm.

(3) 0.4 g of hydroxyethyl cellulose was completely dissolved in the exfoliated α-ZrP nanosheet dispersion to obtain a homogeneous aqueous dispersion system of a-ZrP/cellulose. Then, the homogeneous aqueous dispersion system of α-ZrP/cellulose was poured into a copper-bottomed mold parallel to the ground. Liquid nitrogen was added to cover the bottom of the copper-bottomed mold to freeze the homogeneous aqueous dispersion system. When the homogeneous aqueous dispersion system was completely frozen, the copper-bottomed mold was transferred to a freeze dryer. The freeze-drying was performed at −65° C. and a vacuum degree of −0.05 MPa for 36 h. After the freeze-drying, the copper-bottomed mold was demolded to obtain the α-ZrP aerogel with the thickness of 0.1 mm and the surface density of 40 g/m$^2$.

(4) The α-ZrP aerogel prepared in step (3) was immersed in the epoxy resin system prepared in step (1), followed by vacuumization at 70° C. and a pumping rate of 2 L/min for 0.5 h to completely fill the α-ZrP aerogel with the epoxy resin until there were no air bubbles. Then, the temperature was raised to 100° C. for pre-curing, and the epoxy resin was gelatinous to obtain a pre-cured body of the bio-inspired nacre-like toughening structure.

(5) A release agent was coated on a surface of a rigid single-sided mold followed by laying the glass fiber-reinforced epoxy resin composite, the pre-cured body of the bio-inspired nacre-like toughening structure obtained in step (4), and the UHMWPE fiber-reinforced epoxy resin composite in turn, and sealing the above material system on the rigid single-sided mold with a polytetrafluoroethylene (PTFE) film. Then, the rigid single-sided mold was connected to a vacuum pump, transferred to a heating table, and cured at 140° C. and under 1 standard atmospheric pressure for 3 h, thereby obtaining the high-velocity impact-resistant wave-transparent composite with a bio-inspired nacre-like interlaminar toughening structure including a glass fiber-reinforced epoxy resin composite and a UHMWPE fiber-reinforced epoxy resin composite.

The preparation methods of the glass fiber-reinforced epoxy resin composite and the UHMWPE fiber-reinforced epoxy resin composite were as follows.

(I) Preparation of Epoxy Resin Matrix 150 g of E-51 epoxy resin was weighed, followed by adding 118.5 g of HHPA and 0.7 g of DMP-30, and mixing uniformly and performing vacuum degassing at 50° C. until no bubbles were generated to obtain the epoxy resin matrix.

(II) Preparation of Glass Fiber-Reinforced Epoxy Resin Composite

A mold was coated with a release agent. Glass fiber cloth was laid in an orthogonal method. After each layer of the glass fiber cloth was laid, the laminated glass fiber cloth was immersed with the epoxy resin matrix prepared in step (I). After 10 layers of the glass fiber cloth were laid, the mold was wrapped with a PTFE film. Then, the mold was hot pressed at 100° C. for 45 min and then hot pressed at 140° C. for 2 h in a hot press machine to obtain the glass fiber-reinforced epoxy resin composite.

(III) Preparation of UHMWPE Fiber-Reinforced Epoxy Resin Composite

A mold was coated with a release agent. UHMWPE fiber cloth was laid by the orthogonal method. After each layer of UHMWPE fiber cloth was laid, the laminated UHMWPE fiber cloth was immersed with the epoxy resin matrix prepared in step (I). After 10 layers of UHMWPE fiber cloth were laid, the mold was wrapped with a PTFE film. Then, the mold was hot pressed at 100° C. for 45 min and then hot pressed at 140° C. for 2 h in a hot press machine to obtain the UHMWPE fiber-reinforced epoxy resin composite.

Figure 1:
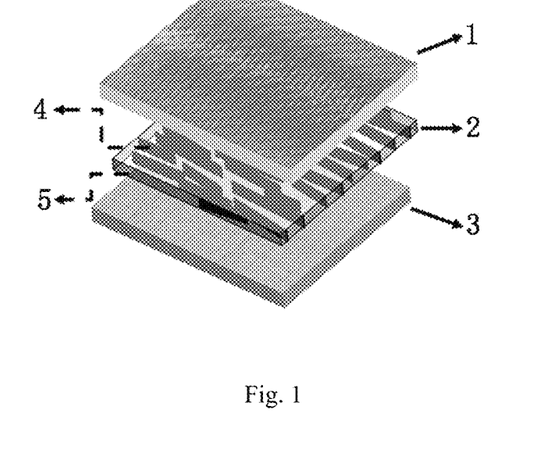
FIG. 1 schematically shows a structure of the high-velocity impact-resistant wave-transparent composites with a bio-inspired nacre-like interlaminar toughening structure according to an embodiment of the present disclosure.
Figure 2:
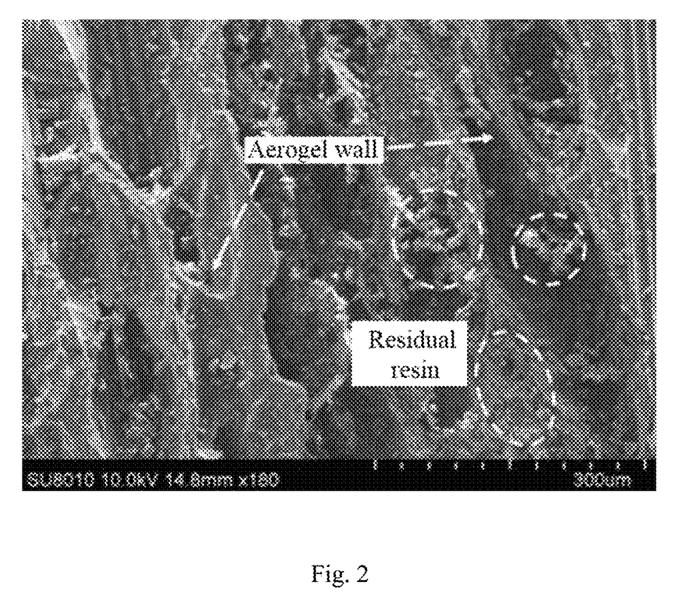
FIG. 2 shows a scanning electron microscope (SEM) image of the high-velocity impact-resistant wave-transparent composites with the bio-inspired nacre-like interlaminar toughening structure prepared in Example 1 after a high-velocity impact.

FIG. 2 was a SEM image of the high-velocity impact-resistant wave-transparent composite prepared in Example 1 after the high-velocity impact. As shown in FIG. 2, the aerogel was in a crosslinked mesh structure located in the interlaminar and oriented perpendicular to the horizontal direction; there was a residual broken resin caused by stress concentration between the aerogel walls; and the aerogel walls appeared to be missing to different degrees due to crack extension. The phenomena indicated the enhancement of interlaminar toughness.

Comparative Example 1

Provided herein was a method for preparing a composite including a pure epoxy resin toughening structure arranged between a glass fiber-reinforced epoxy resin composite and a UHMWPE fiber-reinforced epoxy resin composite.
(1) This step was the same as the step (1) of Example 1.
(2) A release agent was coated on a surface of a rigid single-sided mold followed by laying a glass fiber-reinforced epoxy resin composite, coating the epoxy resin system obtained in step (1), and an UHMWPE fiber-reinforced epoxy resin composite in turn, and sealing the above material system on the rigid single-sided mold with a PTFE film. Then, the rigid single-sided mold was connected to a vacuum pump, transferred to a heating table, and cured at 140° C. and under 1 standard atmospheric pressure for 3 h, thereby obtaining the pure epoxy resin toughening composite including a glass fiber-reinforced epoxy resin composite and a UHMWPE fiber-reinforced epoxy resin composite.

The preparation methods of the glass fiber-reinforced epoxy resin composite and the UHMWPE fiber-reinforced epoxy resin composite were the same as those of Example 1.

Comparative Example 2

Provided herein was a method for preparing a composite including an α-ZrP powder/epoxy resin composite toughening structure arranged between a glass fiber-reinforced epoxy resin composite and a UHMWPE fiber-reinforced epoxy resin composite.
(1) 20 g of E-51 epoxy resin was weighed, followed by adding 15.8 g of HHPA, 0.06 g of DMP-30, and an equal amount of α-ZrP powder as in Example 1, uniform mixing, and vacuum degassing at 50° C. until no bubbles are generated, so as to obtain the α-ZrP powder/epoxy resin mixture.
(2) This step was basically the same as the step (2) of Comparative example 1, except that the surface of a glass fiber-reinforced epoxy resin composite was coated with the α-ZrP powder/epoxy resin mixture obtained in step (1).

The preparation methods of the glass fiber-reinforced epoxy resin composite and the UHMWPE fiber-reinforced epoxy resin composite were the same as those of Example 1.

Example 2

Provided herein was a method for preparing a high-velocity impact-resistant wave-transparent composite including a bio-inspired nacre-like interlaminar toughening structure arranged between a glass fiber-reinforced epoxy resin composite and a polyvinyl chloride closed-cell foam board.
(1) 30 g of E-51 epoxy resin was weighed, followed by adding 23.7 g of HHPA and 0.09 g of DMP-30, uniform mixing, and vacuum degassing at 50° C. until no bubbles were generated to obtain the epoxy resin system.
(2) 2.15 g of α-ZrP powder was uniformly dispersed in 150 mL of deionized water, followed by adding 2.27 g of triethanolamine at a molar ratio of 2:1 and stirring for uniform dispersion to obtain the intercalated α-ZrP dispersion. The intercalated a-ZrP dispersion was transferred to an ultrasonic cell disrupter followed by performing ultrasonication at a power of 300 W for 6 min, thereby obtaining the exfoliated α-ZrP nanosheet dispersion. The two-dimensional α-ZrP sheet had an average sheet size of 1000 nm and an average sheet thickness of 60 nm.
(3) This step was the same as the step (3) of Example 1. The obtained α-ZrP aerogel had a thickness of 0.2 mm and a surface density of 80 g/m$^2$.
(4) This step was the same as the step (4) of Example 1.
(5) This step was almost the same as the step (5) of Example 1, except that the UHMWPE fiber-reinforced epoxy resin composite was replaced with a cleaned polyvinyl chloride closed-cell foam board.

The glass fiber-reinforced epoxy resin composite was prepared as follows.
(I) This step was the same as the step (I) of Example 1.
(II) This step was the same as the step (II) of Example 1.
(III) Treatment of the polyvinyl chloride foam board: the surfaces of the foam board were cleaned with deionized water, followed by wiping with ethanol several times.

Comparative Example 3

Provided herein was a method for preparing a composite including a pure epoxy resin toughening structure arranged between a glass fiber-reinforced epoxy resin composite and a polyvinyl chloride closed-cell foam board.
(1) This step was the same as the step (1) of Example 2.
(2) A release agent was coated on the surface of a rigid single-sided mold followed by laying a glass fiber-reinforced epoxy resin composite, coating the epoxy resin obtained in step (1), and laying a polyvinyl chloride closed-cell foam board in turn, and sealing the above material system on the rigid single-sided mold with a PTFE film. Then, the rigid single-sided mold was connected to a vacuum pump, transferred to a heating table, and cured at 140° C. and under 1 standard atmospheric pressure for 3 h, thereby obtaining the pure epoxy resin toughening composite including a glass fiber-reinforced epoxy resin composite and a polyvinyl chloride closed-cell foam board.

The preparation method of the glass fiber cloth-reinforced epoxy resin composite and the cleaning method of the polyvinyl chloride closed-cell foam board were the same as those of Example 2.

Comparative Example 4

Provided herein was a method for preparing a composite including an α-ZrP powder/epoxy resin composite toughening structure including a glass fiber-reinforced epoxy resin composite and a polyvinyl chloride closed-cell foam board.
(1) 30 g of E-51 epoxy resin was weighed, followed by adding 23.7 g of HHPA, 0.09 g of DMP-30, and an equal amount of α-ZrP powder as in Example 2, uniform mixing, and vacuum degassing at 50° C. until no bubbles are generated, so as to obtain the α-ZrP powder/epoxy resin mixture.
(2) This step was almost the same as the step (2) of Comparative example 3, except that the surface of a glass fiber-reinforced epoxy resin composite was coated with the α-ZrP powder/epoxy resin mixture obtained in step (1).

The preparation method of the glass fiber-reinforced epoxy resin composites and the cleaning method of a polyvinyl chloride closed-cell foam board were the same as those of Example 2.

Table 1 showed performance comparison between the toughening composites prepared in Examples 1-2 and Comparative examples 1-4. The dielectric constant and dielectric loss angle tangent of the interlaminar toughening structures were measured by a coaxial method. The flexural strength and flexural strain of the toughening composites were measured according to ASTM D 638. The Mode I energy release rate was measured according to ASTM D5045. The Mode I energy release rate of the interlaminar toughening structures was measured according to ASTM D5528. The Mode II energy release rate was measured according to HB 7403. The interlaminar shear strength was measured according to ASTM D2344.

TABLE 1

Test results of Examples 1-2 and Comparative examples 1-4

|  | Comparative Example 1 | Comparative Example 2 | Example 1 | Comparative Example 3 | Comparative Example 4 | Example 2 |
|---|---|---|---|---|---|---|
| Dielectric constant of interlaminar toughening structures | 3.86 | 2.96 | 2.45 | 3.91 | 3.11 | 2.72 |
| Dielectric loss angle tangent of interlaminar toughening structures | 0.034 | 0.029 | 0.028 | 0.036 | 0.031 | 0.030 |
| Flexural strength of interlaminar toughening structures/MPa | 97 | 116 | 130 | 115 | 122 | 123 |
| Maximum flexural strain of interlaminar toughening structures/% | 4.1 | 4.4 | 6 | 4.2 | 4.6 | 4.9 |
| Mode I critical energy release rate of interlaminar toughening structures/kJ/m$^2$ | 0.9 | 1.2 | 1.58 | 1.1 | 1.2 | 1.3 |
| Mode I critical energy release rate of bonding interfaces of composites/kJ/m$^2$ | 1.1 | 1.0 | 1.2 | 1.03 | 1.11 | 1.15 |
| Mode II critical energy release rate of bonding interfaces of composites/kJ/m$^2$ | 1.4 | 1.7 | 3.8 | 2.0 | 2.1 | 3.2 |
| Interlaminar shear strength of composites/MPa | 61 | 65 | 75 | 63 | 71 | 73 |

As shown in Table 1, compared to Comparative examples, the performances of the composites in all the examples were enhanced. Due to the use of materials with a low dielectric constant and the unique nacre-like brick-and-mortar structure, the interlaminar bio-inspired nacre-like toughening structure proposed herein not only possessed a low dielectric constant and a low dielectric loss, but also exhibited good mechanical properties. In addition, both the interfacial energy release rate and the interlaminar shear strength were significantly improved, indicating that the interlayer toughened by the interlaminar structure of the present disclosure had excellent resistance to crack generation and propagation. Therefore, it could be concluded that the toughening structure provided herein can significantly improve the interlaminar fracture toughness of the composite material, and has a broad application prospect.

The bio-inspired nacre-like toughening structure provided herein can improve the overall modulus of the composite, which is conductive to the stress transfer and can improve the load-bearing performance of the overall structure. In the case of encountering the interlaminar crack propagation caused by external impacts, the aerogel wall formed by α-ZrP sheets will undergo slipping, pulling out, and fracture to alleviate and eliminate the stress concentration at the crack tip, dissipate lots of energy, and trigger the crack deflection, bifurcation and termination to prevent the interlayer propagation of main cracks, so as to effectively inhibit the delamination. In addition, the modulus of the α-ZrP sheet is significantly different from that of the resin, and the alternating arrangement of the materials with a relatively large modulus difference can also enhance the crack arrest performance. The interlayer aerogel can extend the interlayer space and increase the resin content between the composite material layers, so that it is more difficult for cracks to extend to the relatively-fragile interface, thereby improving the overall performance and the anti-delamination performance of the composite effectively. Further, the special oriented α-ZrP interlaminar structure can offer an obvious interfacial effect. Moreover, α-ZrP, as a low dielectric constant material, is filled in the form of an aerogel between the composite layers, which can reach a relatively low interlayer dielectric constant value.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A wave transparent composite with an impact-resistant performance, comprising:
   an upper composite layer;
   a lower composite layer; and
   a bio-inspired nacreous toughening structure arranged between the upper composite layer and the lower composite layer; and
   wherein the upper composite layer and the lower composite layer are each independently made of a fiber-reinforced resin composite, a foam material, or a honeycomb material;
   the bio-inspired nacreous toughening structure is prepared through steps of:
   exfoliating an original α-ZrP sheet material with an amino-containing small molecule substance as an exfoliating agent by an ultrasound-assisted exfoliation process under a preset ultrasound power for a preset period to arrive at the α-ZrP nanosheet with a desired two-dimensional size and a thickness;
   preparing an aqueous dispersion system of the α-ZrP nanosheet and a cellulose;
   performing a directional freezing on the aqueous dispersion system to construct an α-ZrP aerogel with an oriented continuous network structure, wherein the α-ZrP aerogel is oriented perpendicular to a horizontal direction and has a uniform wall thickness and a uniform pore distribution; and the cellulose is constructed as a framework for structurally reinforcing the α-ZrP aerogel, and the cellulose is selected from the group consisting of carboxymethyl cellulose, hydroxyethyl cellulose, hydroxypropyl cellulose, bacterial cellulose and a combination thereof; and
   infusing a thermosetting resin system into the α-ZrP aerogel to form a bio-inspired nacreous toughening structure with a soft-hard alternating nacreous structure, wherein the resin is configured as a soft layer, and a wall of the α-ZrP aerogel is configured as a hard layer; and the thermosetting resin system is configured to bond the α-ZrP aerogel into a whole to maintain the α-ZrP aerogel in a certain shape, transmit an interlaminar stress, and protect the α-ZrP aerogel from external erosion and damage; and the hard layer is filled between the upper composite layer and the lower composite layer in an aerogel form to improve interlaminar mechanical performance and wave-transparent performance.

2. The wave-transparent composite of claim 1, wherein the exfoliating agent is selected from the group consisting of triethanolamine, ethylenediamine, lysine and a combination thereof.

3. The wave-transparent composite of claim 1, wherein the resin is a thermosetting resin system obtained by uniformly mixing a thermosetting resin, a curing agent, and a reaction aid; the thermosetting resin is selected from the group consisting of an epoxy resin, an unsaturated polyester resin, a phenolic resin and a combination thereof; and the reaction aid is selected from the group consisting of an initiator, an accelerator, a catalyst and a combination thereof.

4. The wave-transparent composite of claim 1, wherein in the aqueous dispersion system, a weight ratio of the α-ZrP nanosheet to the cellulose is 10-5:2-1.

5. The wave-transparent composite of claim 1, wherein the α-ZrP nanosheet has a nanoscale two-dimensional sheet structure with a two-dimensional sheet size of 300-1700 nm and a sheet thickness of 30-100 nm; and the α-ZrP aerogel has a thickness of 0.1-0.4 mm and a surface density of 20-100 g/m$^2$.

6. The wave-transparent composite of claim 1, wherein the bio-inspired nacreous toughening structure has a thickness of 0.1-0.4 mm, a dielectric constant of 2.45-2.72, a loss tangent of 0.028-0.042, a flexural strength of 100-130 MPa, a maximum flexural strain of 4-6%, and a mode I critical energy
   release rate of 1.02-1.58 kJ/m$^2$;
   wherein for the wave-transparent composite, a mode I critical energy release rate of a bonding interface is 0.7-1.2 kJ/m$^2$, a mode II critical energy release rate of the bonding interface is 3.0-3.8 KJ/m$^2$, and an interlaminar shear strength is 55-75 MPa.

7. A method for preparing the wave-transparent composite of claim 1, comprising:
   (1) dispersing α-ZrP powder in water followed by addition of an exfoliating agent and stirring for uniform dispersion to obtain an intercalated α-ZrP dispersion; and
   transferring the intercalated α-ZrP dispersion to an ultrasonic cell disrupter followed by ultrasonication to obtain an exfoliated α-ZrP dispersion with a desired exfoliation degree;
   (2) dissolving a cellulose in the exfoliated α-ZrP dispersion to obtain an aqueous dispersion system; pouring the aqueous dispersion system into a copper-bottomed mold parallel to the ground; adding liquid nitrogen to cover a bottom of the copper-bottomed mold to freeze the aqueous dispersion system; when the aqueous dispersion system is completely frozen, transferring the copper-bottomed mold to a freeze dryer following by freeze-drying and demolding to produce an α-ZrP aerogel;
   (3) mixing a thermosetting resin with a curing agent under mechanical stirring to reach a uniform color, followed by addition of a reaction aid, mechanical stirring and vacuum degassing in an oven until no bubbles are generated to obtain a thermosetting resin system;
   (4) immersing the α-ZrP aerogel obtained in step (2) in the thermosetting resin system obtained in step (3) followed by vacuumization to completely fill the α-ZrP aerogel with the resin system and pre-curing at an elevated temperature to obtain a pre-cured body of the bio-inspired nacreous interlaminar toughening structure; and
   (5) placing the pre-cured body between an upper composite layer and a lower composite layer followed by integral curing through a liquid molding process or an autoclave molding process to obtain the wave-transparent composite, wherein the upper composite layer and the lower composite layer are each independently made of a fiber-reinforced resin composite, a foam material, or a honeycomb material.

8. The method of claim 7, wherein in step (1), the ultrasonication is performed at 150-300 W for 3-15 min; and in step (2), a temperature of the liquid nitrogen is −196° C.; and the freeze-drying is performed at a temperature ranging from −65° C. to −45° C. and a vacuum degree ranging from −0.05 MPa to −0.09 MPa for 36-48 h.

9. The method of claim 7, wherein in step (4), the vacuumization is performed at a temperature of 60-80° C. and an exhaust rate of 2 L/min for 0.5-1 h to reach a vacuum degree of −0.09 MPa.

* * * * *